US012614094B2

(12) United States Patent
Ezrielev et al.

(10) Patent No.: US 12,614,094 B2
(45) Date of Patent: Apr. 28, 2026

(54) SYSTEM AND METHOD FOR MANAGING DATA PROCESSING SYSTEMS HOSTING DISTRIBUTED INFERENCE MODELS

(71) Applicant: Dell Products L.P., Round Rock, TX (US)

(72) Inventors: Ofir Ezrielev, Beer Sheva (IL); Jehuda Shemer, Kfar Saba (IL); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 751 days.

(21) Appl. No.: 18/060,095

(22) Filed: Nov. 30, 2022

(65) Prior Publication Data

US 2024/0177025 A1     May 30, 2024

(51) Int. Cl.
*G06N 5/043* (2023.01)

(52) U.S. Cl.
CPC .................................... *G06N 5/043* (2013.01)

(58) Field of Classification Search
None
See application file for complete search history.

(56) References Cited

U.S. PATENT DOCUMENTS

| | | | |
|---|---|---|---|
| 7,593,729 B2 | 9/2009 | Barak |
| 10,142,174 B2 | 11/2018 | Yang et al. |
| 10,341,354 B2 | 7/2019 | Murugesan et al. |
| 10,853,129 B1 | 12/2020 | Sengupta |

| | | | |
|---|---|---|---|
| 11,216,482 B2 | 1/2022 | Khillar et al. |
| 11,886,960 B2 | 1/2024 | Kaufmann |
| 2008/0256167 A1 | 10/2008 | Branson |
| 2016/0098297 A1 | 4/2016 | Yuyitung |
| 2018/0365576 A1 | 12/2018 | Guttmann |
| 2019/0050505 A1 | 2/2019 | Nendorf |
| 2019/0102700 A1 | 4/2019 | Babu |
| 2019/0266504 A1 | 8/2019 | Apparao |
| 2020/0027157 A1 | 1/2020 | Xu |
| 2020/0104749 A1 | 4/2020 | Sartorello |
| 2020/0145448 A1 | 5/2020 | Vu |
| 2020/0193313 A1* | 6/2020 | Ghanta ................... G06N 20/00 |
| 2020/0219007 A1 | 7/2020 | Byers |
| 2021/0255886 A1 | 8/2021 | Von Niederhausern |
| 2021/0319098 A1* | 10/2021 | Pogorelik ............. G06F 21/554 |

(Continued)

OTHER PUBLICATIONS

"Software performance testing", Wikipedia, Wikimedia Foundation, https://en.wikipedia.org/wiki/Software_performance_testing (8 Pages).

(Continued)

*Primary Examiner* — Mandrita Brahmachari
(74) *Attorney, Agent, or Firm* — WOMBLE BOND DICKINSON (US) LLP

(57) ABSTRACT

Methods and systems for managing inference models hosted by data processing systems are disclosed. To manage the inference models, data processing systems that host the inference models may be monitored for risk of compromise. The data processing systems may be monitored by evaluating the processing results generated by the data processing systems. When a data processing system is identified as being compromised, a self-healing process or other remediation process may be initiated to reduce or eliminate the threat to successful inference generation presented by the compromised data processing system.

20 Claims, 6 Drawing Sheets

(56) References Cited

U.S. PATENT DOCUMENTS

| | | | |
|---|---|---|---|
| 2022/0036160 A1* | 2/2022 | Sasagawa | G06N 3/045 |
| 2022/0156368 A1* | 5/2022 | Spyridopoulos | G06N 20/00 |
| 2022/0269835 A1 | 8/2022 | Yang | |
| 2022/0414503 A1 | 12/2022 | Park | |
| 2023/0010769 A1* | 1/2023 | Umezawa | G16H 50/20 |
| 2023/0012487 A1 | 1/2023 | Makaya | |
| 2023/0168932 A1 | 6/2023 | Rafferty | |
| 2023/0168950 A1 | 6/2023 | Lee | |
| 2023/0252328 A1 | 8/2023 | Swami | |
| 2023/0267344 A1 | 8/2023 | Chang | |
| 2023/0273813 A1 | 8/2023 | Fong | |
| 2023/0342203 A1 | 10/2023 | Yang | |
| 2024/0020296 A1 | 1/2024 | Ezrielev | |
| 2024/0020555 A1 | 1/2024 | Ezrielev | |
| 2025/0030766 A1 | 1/2025 | Dubey | |
| 2025/0265383 A1 | 8/2025 | Nendorf | |

OTHER PUBLICATIONS

"The Ultimate Guide to Performance Testing and Software Testing: Testing Types, Performance Testing Steps, Best Practices, and More", Stackify, Apr. 16, 2021, https://stackify.com/ultimate-guide-performance-testing-and-software-testing/ (23 Pages).

"High availability software", Wikipedia, Wikimedia Foundation, https://en.wikipedia.org/wiki/High_availability_software (5 Pages).

"Load balancing (computing)", Wikipedia, Wikimedia Foundation, https://en.wikipedia.org/wiki/Load_balancing(computing) (17 Pages).

Thompson, Julie D. et al., "Multiple Sequence Alignment Using ClustalW and ClustalX", Current Protocols in Bioinformatics (2003) 2.3.1-2.3.22 (22 Pages).

Zhao, Shixiong et al., "HAMS: High Availability for Distributed Machine Learning Service Graphs", 2020 50th Annual IEEE/IFIP International Conference on Dependable Systems and Networks (DSN). IEEE, 2020 (13 Pages).

Hu, Chenghao et al., "Distributed Inference with Deep Learning Models across Heterogeneous Edge Devices." IEEE INFOCOM 2022—IEEE Conference on Computer Communications. IEEE, 2022 (8 Pages).

Abadi, Martin et al. (Mar. 16, 2016). "TensorFlow: Large-Scale machine learning on heterogeneous distributed systems." arXiv.org. <https://arxiv.org/abs/1603.04467> (19 pages).

Eck, B., Fusco, F., Gormally, R., Purcell, M., & Tirupathi, S. (Mar. 24, 2020). "Scalable deployment of AI time-series models for IoT." arXiv preprint arXiv:2003.12141. (7 pages).

Chen, B., Eck, B., Fusco, F., Gormally, R., Purcell, M., Sinn, M., & Tirupathi, S. (Nov. 2018). "Castor: Contextual IoT time series data and model management at scale." In 2018 IEEE International Conference on Data Mining Workshops (ICDMW) (pp. 1487-1492). IEEE. Retrieved from <https://arxiv.org/pdf/1811.08566> on Oct. 10, 2025. (6 pages).

Saeed et al., "Model Adaptation and Personalization for Physiological Stress Detection." Oct. 2018. (Year: 2018) Retrieved from <https://tstojan.github.io/pub/DSAA2018_ModelAdaptandPersonPhysiologicaStressDetection.pdf> on Oct. 13, 2025. (8 pages).

Zhang et al., "Bandwidth-Efficient Multi-Task AI Inference with Dynamic Task Importance for the Internet of Things in Edge Computing." Aug. 2022. (Year: 2022) (13 pages).

Liang et al., "Model-driven Cluster Resource Management for AI Workloads in Edge Clouds"; arXiv:2201.07312v1 [cs.DC] Jan. 18, 2022; Total pp. 23 (Year: 2022), Retrieved from <https://arxiv.org/abs/2201.07312> on Sep. 2, 2025.

Filho et al., "A Systematic Literature Review on Distributed Machine Learning in Edge Computing"; Sensors 2022, 22, 2665. Published Mar. 23, 2022; Total pp. 36 (Year: 2022), Retrieved from <https://doi.org/10.3390/s22072665> on Sep. 2, 2025.

* cited by examiner

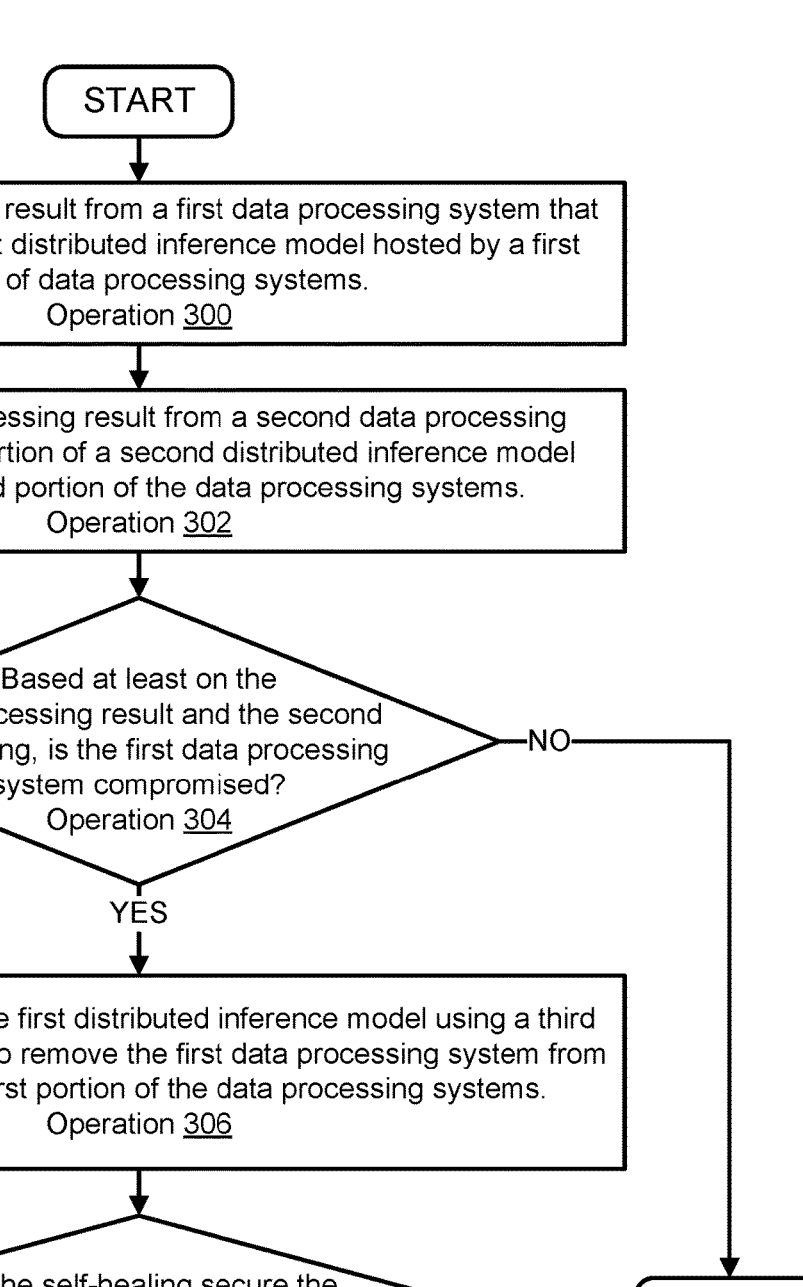

START

Obtain a first processing result from a first data processing system that hosts a portion of a first distributed inference model hosted by a first portion of data processing systems.
Operation 300

Obtain a second processing result from a second data processing system that hosts a portion of a second distributed inference model hosted by a second portion of the data processing systems.
Operation 302

Based at least on the first processing result and the second processing, is the first data processing system compromised?
Operation 304

NO

YES

Initiate self-healing of the first distributed inference model using a third data processing system to remove the first data processing system from membership in the first portion of the data processing systems.
Operation 306

Did the self-healing secure the first distributed inference model?
Operation 308

NO

END

YES

Rebalance the data processing systems to host a number of instances of an inference model of a type of the first distributed inference model as specified by a deployment plan.
Operation 310

FIG. 3

SYSTEM AND METHOD FOR MANAGING DATA PROCESSING SYSTEMS HOSTING DISTRIBUTED INFERENCE MODELS

FIELD

Embodiments disclosed herein relate generally to inference generation. More particularly, embodiments disclosed herein relate to systems and methods to manage data processing systems used to generate inferences.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements

FIG. 3 shows a flow diagram illustrating a method of managing inference models in accordance with an embodiment.

DETAILED DESCRIPTION

Figure 1:
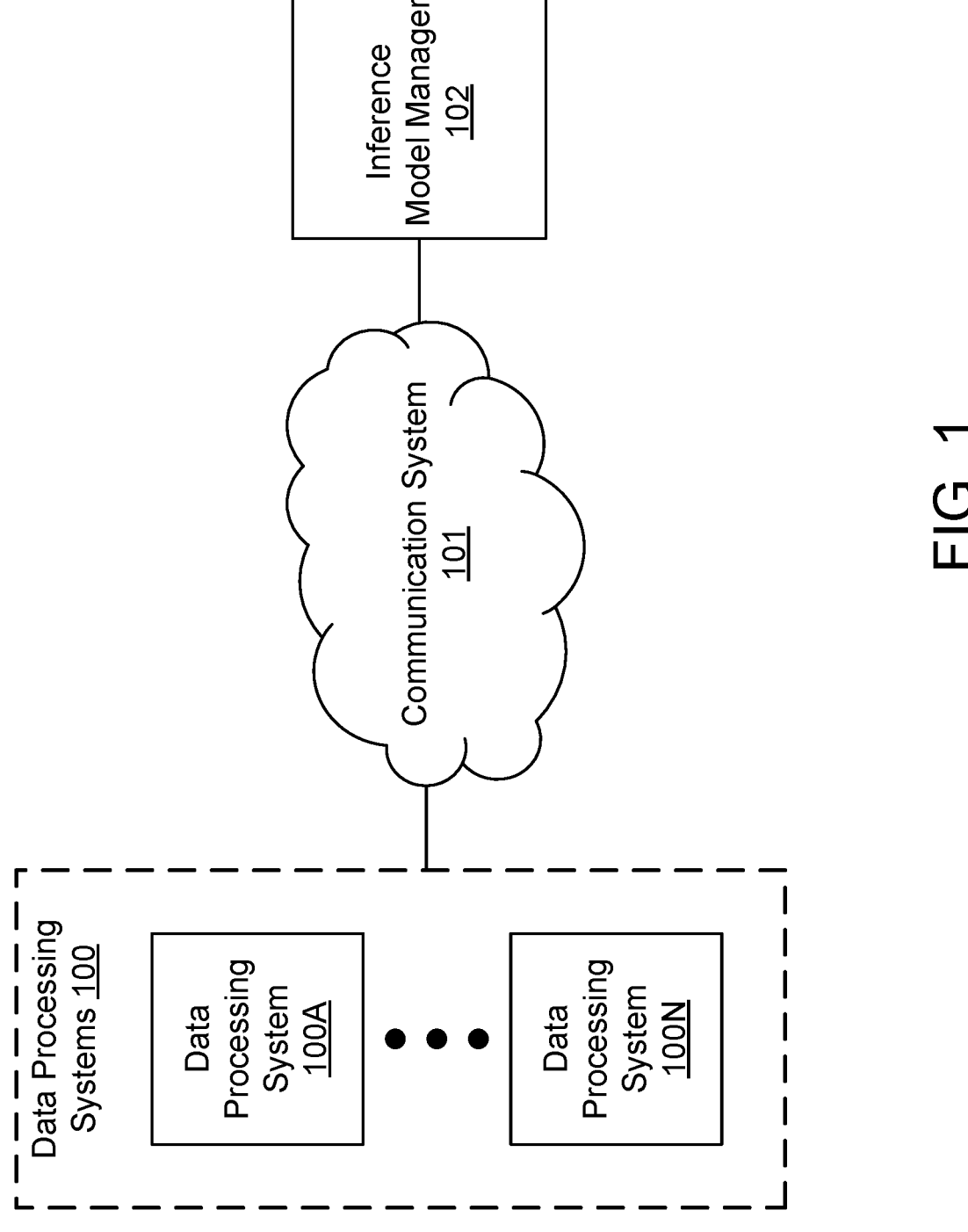
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "an embodiment" or "an embodiment" means that a particular feature, structure, or characteristic described in conjunction with the embodiment can be included in at least an embodiment. The appearances of the phrases "in an embodiment" and "an embodiment" in various places in the specification do not necessarily all refer to the same embodiment.

In general, embodiments disclosed herein relate to methods and systems for managing inference models hosted by data processing systems. The inference models may generate inferences used to provide computer implemented services.

To manage the inference models, the data processing systems that host portions of the inference models may be evaluated for risk of compromise. A compromised data processing system may impair the ability of an inference model to generate desired inferences.

To evaluate the risk of compromise, processing results from multiple data processing systems may be obtained and compared to one another. If the processing results differ, one or more of the data processing systems may be compromised.

When a data processing system is identified as likely being compromised, a self-healing process may be initiated to attempt to remediate operation of an inference model supported by the data processing system. If the self-healing process is not successful, the data processing systems hosting the inference model may be disabled or otherwise removed from inference generation, and the inference model may be deployed to other data processing systems through a rebalancing processing.

By doing so, the risk presented to accurate inference generation by compromised data processing systems may be mitigated through proactive identification and remediation of the compromised data processing systems. Thus, embodiments disclosed herein may provide improved computing devices that are better able to marshal limited computing resources for inference generation while still meeting accuracy and reliability goals even when high complexity security (e.g., active scanning for threats) of the data processing systems cannot be implemented due to limited computing resources. Accordingly, embodiments disclosed herein may address, among others, the technical challenge of limited computing resources for providing computer implemented services. The disclosed embodiments may address this problem by improving the efficiency of use of computing resources for inference generation while also mitigating potential security threats due to compromises of data processing systems over time.

In an embodiment, a method of managing inference models hosted by data processing systems is provided. The method may include obtaining a first processing result from a first data processing system that hosts a portion of a first distributed inference model hosted by a first portion of the data processing systems; obtaining a second processing result from a second data processing system that hosts a portion of a second distributed inference model hosted by a second portion of the data processing systems; making a determination, based at least in part on the first processing result and the second processing result, regarding whether the first data processing system is compromised; in an instance of the determination where the first data processing system is compromised: initiating self-healing of the first distributed inference model using a third data processing system to remove the first data processing system from membership in the first portion of the data processing systems.

Making the determination may include making a first comparison between the first processing result and the second processing result; in an instance of the first comparison where the comparison where the first processing result and the second processing result are different: obtaining a third processing result from a third data processing system that hosts a portion of a third distributed inference model hosted by a third portion of the data processing systems; and making a second comparison between the first processing result and the third processing result and a third comparison between the second processing result and the third processing result; in an instance of the second comparison where the first processing result and the third processing result are different and in an instance of the third comparison where the second processing result and the third processing are not different: determining that the first data processing system is compromised.

The second distributed inference model may be redundant for the first distributed inference model, and the third distributed inference model is redundant for the first distributed inference model.

The first processing result, the second processing result, and the third processing result may be obtained using a same input.

The method may also include making a second determination regarding whether the self-healing has secured the first distributed inference model; in an instance of the second determination where the first distributed inference model is not secured: disabling at least the first data processing system; and rebalancing the data processing systems to host a number of instances of an inference model of a type of the first distributed inference model as specified by a deployment plan for the inference models.

The first processing result may include a partial processing result used by the first distributed inference model to obtain an output.

The first processing result may include an output of the first distributed inference model.

The first processing result may include a first hash of the output of the first distributed inference model and the second processing result is a second hash of an output of the second distributed inference model.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing inference models hosted by data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by the inference models hosted by the data processing systems throughout the distributed environment.

To facilitate execution of the inference models, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of the inference models.

For example, all, or a portion, of data processing systems 100 may provide computer-implemented services to users and/or other computing devices operably connected to data processing systems 100. The computer-implemented services may include any type and quantity of services including, for example, generation of a partial or complete processing result using an inference model of the inference models. Different data processing systems may provide similar and/or different computer-implemented services.

The quality of the computer-implemented services (e.g., provided by data processing systems 100 and/or other device that are not shown in FIG. 1 that may utilize inference to provide computer implemented services) may depend on the accuracy of the inferences and/or availability of inferences provided by the inference models. For example, if an inference is inaccurate or unavailable when needed, the computer implemented services may not meet the goals of downstream consumers of the computer implemented services.

In general, embodiments disclosed herein may provide methods, systems, and/or devices for managing inference models hosted by data processing systems 100 to improve the likelihood of accurate and reliable inferences being available. To manage the inference models hosted by data processing systems 100, a system in accordance with an embodiment may proactively monitor the operation of data processing systems 100. The operation of data processing systems 100 may be monitored to ascertain whether any of data processing systems have become compromised. A compromised data processing system may intentionally or unintentionally disrupt and/or otherwise impair inference generation.

For example, a data processing system may become compromised due to (i) malicious attack on its operation (e.g., via hacking), (ii) impairment of components of the data processing system (e.g., via natural degradation of the data processing system), and/or (iii) via other processes.

Figure 2A:
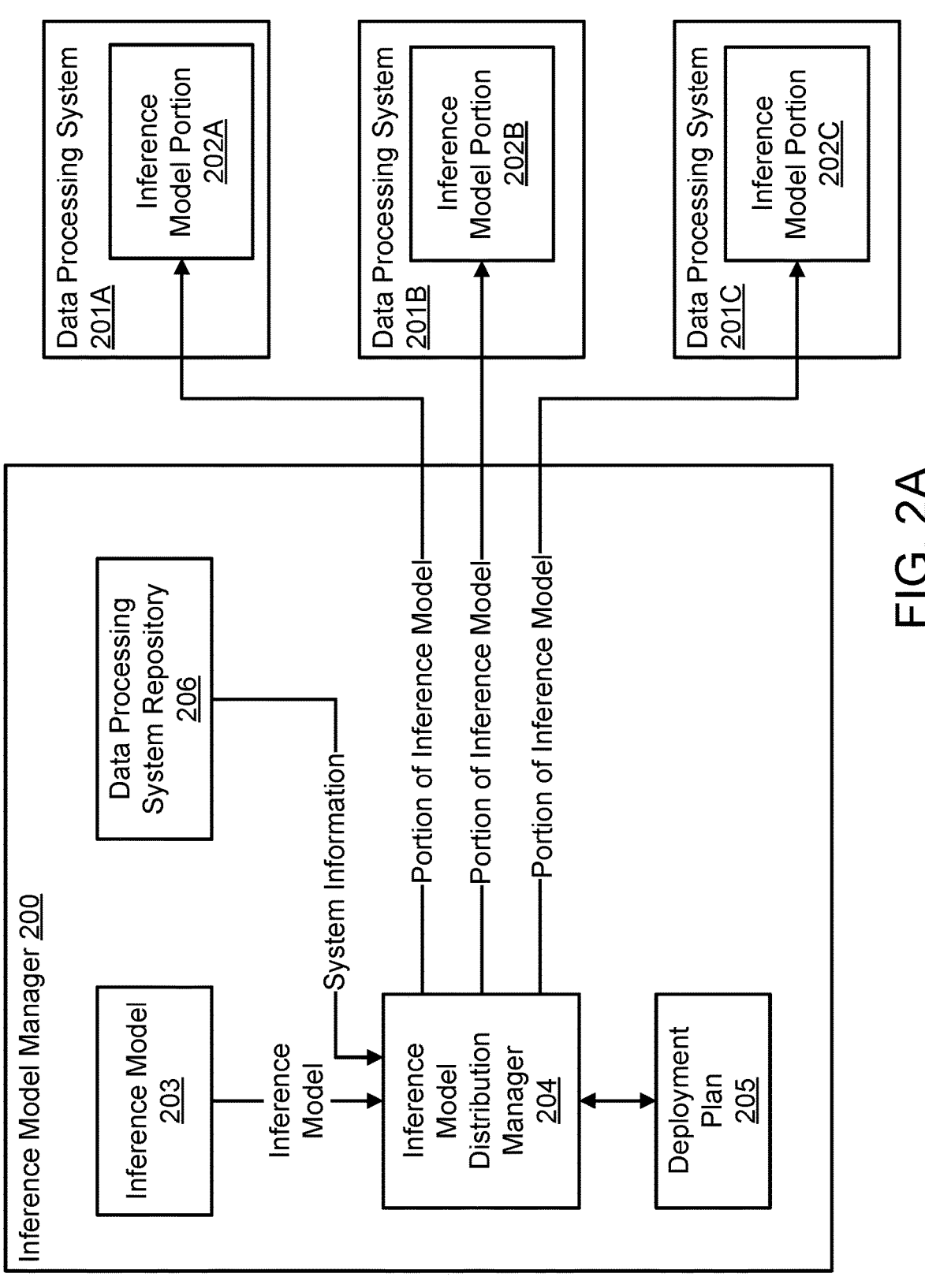
FIG. 2A shows a block diagram illustrating an inference model manager and multiple data processing systems over time in accordance with an embodiment.
Figure 2B:
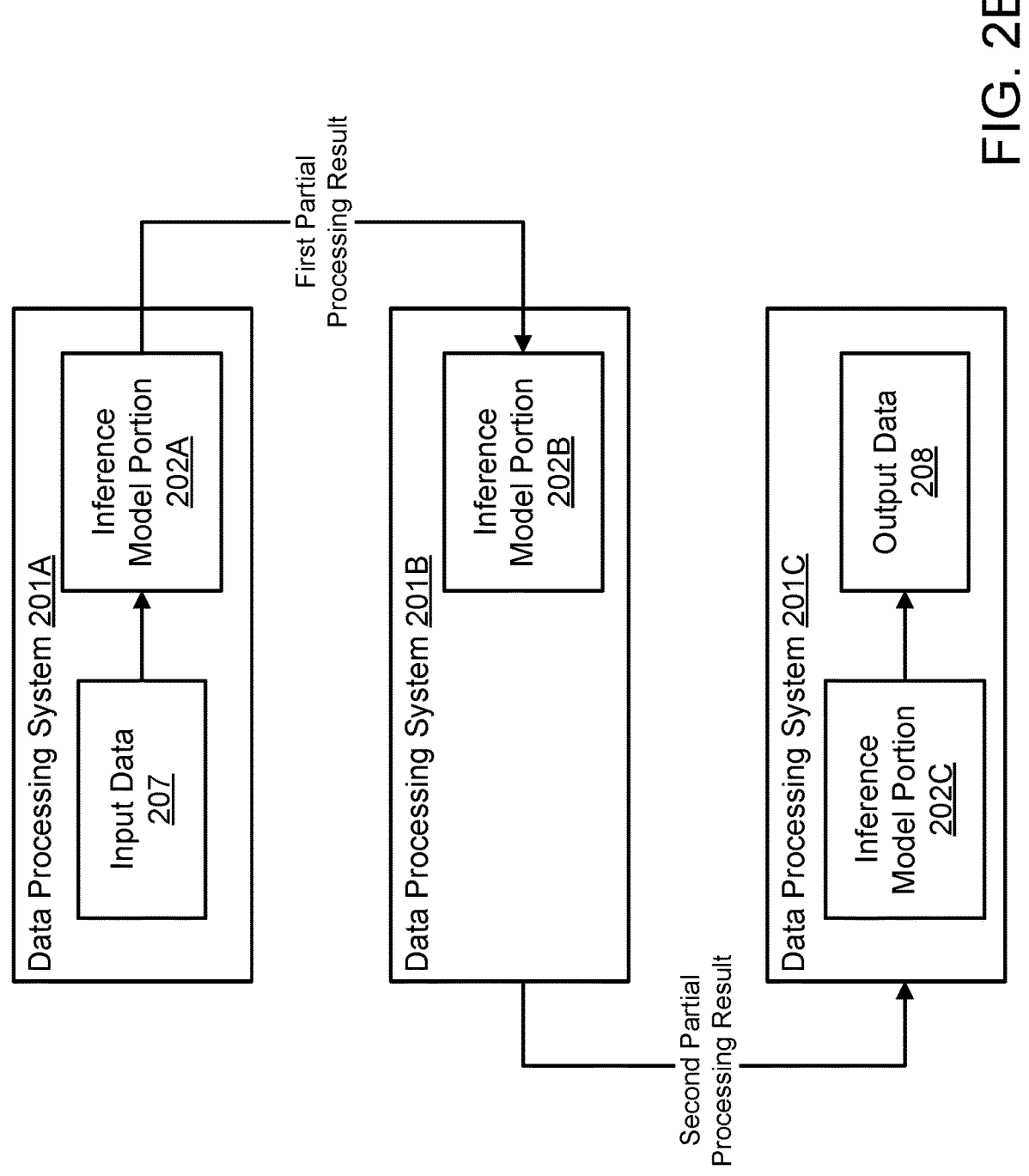
FIG. 2B shows a block diagram illustrating multiple data processing systems over time in accordance with an embodiment.

While a data processing system is compromised, the data processing system may not cooperate in generation of inferences in a manner as expected. For example, if a data processing system has been hacked, the data processing system may perform rogue computations that may disrupt a cooperative processes of generating inferences performed by a group of data processing systems. The data processing system may generate and distribute processing results that are incorrect (e.g., with respect to an expected type of processing result to be generated). Refer to FIG. 2B for additional details regarding processing results and how they may be incorrect when a data processing system is compromised.

Figure 2C:
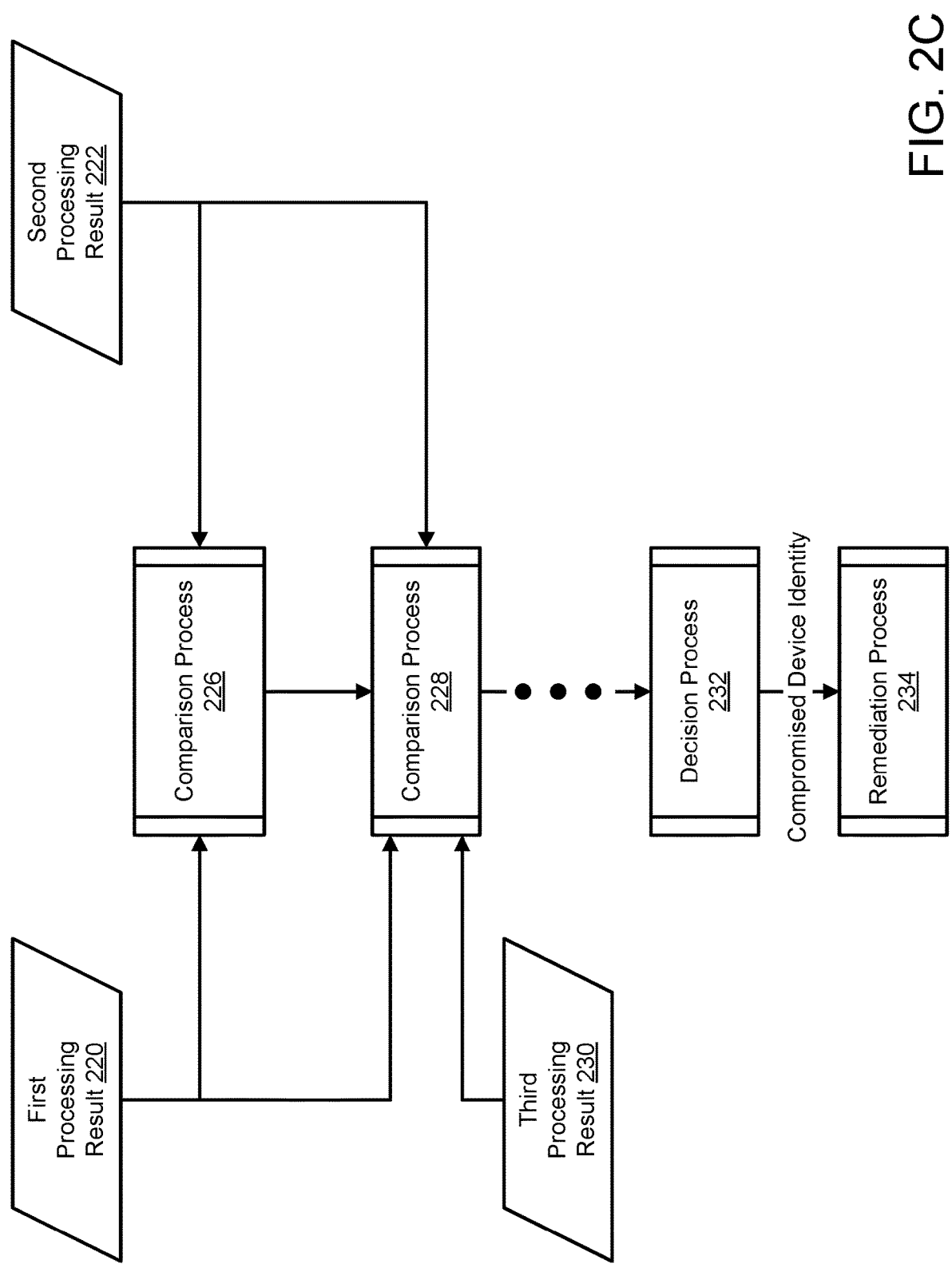
FIG. 2C shows a block diagram illustrating identification of compromised data processing systems in accordance with an embodiment.

To monitor operation of data processing systems 100, processing results from multiple data processing systems (e.g., each believed to be performing redundant computations) may be aggregated and compared. The comparisons between the processing results may be used to ascertain whether any of the data processing systems are generating processing results that are unexpected (e.g., different from the others that are expected to be identical). Data processing systems that are generating unexpected processing results may be treated as being compromised. Refer to FIG. 2C for additional details regarding identification and/or remediation of compromised inference models.

When compromised data processing systems are identified, the system of FIG. 1 may take action to remediate the compromised data processing systems. The remediation process may include (i) initiating self-healing processes, (ii) verifying whether the self-healing processes are successful, and/or (iii) when self-healing processes are not successful, automatically excluding the compromised data processing systems from inference generation and rebalancing data processing systems 100 to host inference models (e.g., distributed across them) in accordance with a deployment plan.

The deployment plan may specify, for example, numbers and types of inference models to be hosted by data processing systems 100. The deployment plan may be based on needs of downstream consumers of the inferences. Refer to FIGS. 2A-2B for additional details regarding obtaining and using deployment plans.

By doing so, embodiments disclosed herein may provide a system that is better able to dynamically respond to changes in operation of data processing systems hosting inference models. For example, edge computing devices, user devices, internet of things (IOT) devices, and/or other types of computing devices may become compromised due to limits in security implemented by these devices, impairment in the operation of components of these devices, and/or for other reasons. By proactively monitoring for and automatically remediating compromised devices, a system in accordance with embodiments disclosed herein may be more likely to successfully generate inferences of desired levels of accuracy. Thus, embodiments disclosed herein may provide an improved data processing system that is more likely to be able to continue to provide desired computer implemented services (which may depend on availability of accurate inferences) while the data processing systems become compromised over time without dedicating significant limited computing resources of these devices for security purposes, health monitoring, etc.

To provide the above noted functionality, the system of FIG. 1 may include inference model manager 102. Inference model manager 102 may (i) establish and deploy inference models in accordance with deployment plans, (ii) monitor the operation of the data processing systems hosting the deployed inference models to identify when they may be compromised, and/or (iii) remediate any compromised inference models. By doing so, inference model manager 102 may manage inference models in a manner that is more likely to result in generation of accurate inferences desired by downstream inference consumers (e.g., which may include any numbers and types of computer implemented services hosted by any number and type of data processing system, not shown in FIG. 1).

Any of the inference models hosted by data processing systems 100 may be distributed. For example, any of the inference models may be implemented using trained neural networks. The trained neural network may include, for example, an input layer, any number of hidden layers, an output layer, and/or other layers. The trained neural networks may be divided into any number of portions and distributed across data processing systems 100. For example, the inference models may be distributed in this manner due to the limited computing resources available to each of data processing systems 100. The inference models may be divided using any method. The deployment plan may take into account this division and may provide for distributed execution of the inference models (e.g., may include information indicating where partial results are to be forwarded). Refer to FIGS. 2A-2B regarding generation of inferences using distributed inference models.

When performing its functionality, inference model manager 102 and/or data processing systems 100 may perform all, or a portion, of the methods and/or actions shown in FIG. 3.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data processing systems 100 and/or inference model manager 102 are implemented using an IoT device, which may include a computing device. The IoT device may operate in accordance with a communication model and/or management model known to inference model manager 102, other data processing systems, and/or other devices.

Any of the components illustrated in FIG. 1 may be operably connected to each other (and/or components not illustrated) with communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIGS. 2A-2C. Specifically, FIGS. 2A-2B illustrate data flows during deployment and execution of distributed inference models, and FIG. 2C illustrates data flow during monitoring and/or remediation of compromised data processing systems.

Turning to FIG. 2A, a diagram of inference model manager 200 and data processing systems 201A-201C in accordance with an embodiment is shown. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing an inference model across multiple data processing systems that each individually have insufficient computing resources (e.g., storage space, processing bandwidth, memory space, etc.) to complete timely execution (e.g., in accordance with an expectation of an entity, such as a downstream consumer of an inference) of the inference model.

While described below with reference to a single inference model (e.g., inference model 203), the process may be repeated any number of times with any number of inference models without departing from embodiments disclosed herein. For example, as part of generating and implementing a deployment plan.

To execute an inference model across multiple data processing systems, inference model manager 200 may obtain inference model portions and may distribute the inference model portions to data processing systems 201A-201C. The inference model portions may be based on: (i) the computing resource availability of data processing systems 201A-201C and (ii) communication bandwidth availability between the data processing systems. By doing so, inference model manager 200 may distribute the computational overhead and bandwidth consumption associated with hosting and operating the inference model across multiple data processing systems. While described and illustrated with respect to distributing inference model portions, it will be appreciated that instructions for which inference models portions to host may be distributed to the data processing systems (or other entities) and the data processing systems may take responsibility for obtaining and hosting the inference models portions without departing from embodiments disclosed herein.

To obtain inference model portions, inference model manager 200 may host inference model distribution manager 204. Inference model distribution manager 204 may (i) obtain an inference model and/or deployment plan 205, (ii) identify characteristics (e.g., available computing resources/ communication bandwidth) of data processing systems to which the inference model may be deployed, (iii) obtain inference model portions based on the characteristics of the data processing systems and characteristics of the inference model, (iv) distribute the inference model portions to the data processing systems, (v) initiate execution of the inference model using the inference model portions distributed to the data processing systems and/or (vi) manage the execution of the inference model based on deployment plan 205.

Inference model manager 200 may obtain inference model 203. Inference model manager 200 may obtain characteristics of inference model 203. The characteristics of inference model 203 may include, for example, a quantity of layers of a neural network inference model and a quantity of relationships between the layers of the neural network inference model. The characteristics of inference model 203 may also include the quantity of computing resources required to host and operate inference model 203. The characteristics of inference model 203 may include other characteristics based on other types of inference models without departing from embodiments disclosed herein.

Each portion of inference model 203 may be distributed to one data processing system throughout a distributed environment. Therefore, prior to determining the portions of inference model 203, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems.

Using the system information, inference model distribution manager 204 may obtain a first portion of the inference model (e.g., inference model portion 202A) based on the system information (e.g., the available computing resources) associated with data processing system 201A and based on data dependencies of the inference model (e.g., weights) so that inference model portion 202A reduces the necessary communications between inference model portion 202A and other portions of the inference model (e.g., when compared to other type of division of the inference model). Inference model distribution manager 204 may repeat the previously described process for inference model portion 202B and inference model portion 202C.

Prior to distributing inference model portions 202A-202C, inference model distribution manager 204 may obtain deployment plan 205. Deployment plan 205 may indicate the distribution of the inference model portions across data processing systems and/or modes of operation for the distributed inference models. The deployment plan may be obtained, for example, by using an objective function or other method to ascertain locations to which inference model portions are to be deployed to meet objectives. These objectives may include, for example, reducing communication bandwidth, reducing latency due to communications, improving reliability of data transmission between data processing systems, elimination or reduction of bottlenecks (e.g., a data processing system that host multiple portions of inference models, which may result in a failure of multiple inference models if the single data processing system fails), and/or other types of goals.

Inference model manager 200 may distribute inference model portion 202A to data processing system 201A, inference model portion 202B to data processing system 201B, and inference model portion 202C to data processing system 201C, in accordance with deployment plan 205. While shown in FIG. 2A as distributing three portions of the inference model to three data processing systems, the inference model may be partitioned into any number of portions and distributed to any number of data processing systems throughout a distributed environment.

Further, while not shown in FIG. 2A, inference model distribution manager 204 may, in accordance with deployment plan 205, distribute (i) redundant copies of the inference model portions to various data processing systems, (ii) distribution copies of other inference model portions to comply with various modes of operation specified by deployment plan 205, and/or (iii) may otherwise prepare data processing systems to respond to potential compromises of any of data processing systems 201A-201C. As will be discussed in greater detail below, the redundantly deployed copies of the inference model may facilitate identification of compromised data processing systems.

Once deployed, inference model portions (e.g., 202A-202C) may execute thereby generating inferences. The inferences may be used to drive downstream computer implemented services such as, for example, database service, communication services, logistics services, and/or any other types of services that may be implemented using inferences.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

Turning to FIG. 2B, a diagram illustrating data flow during execution of inference models portions (e.g., 202A-202C) in accordance with an embodiment is shown. While executing, data processing system 201A may obtain input data 207. Input data 207 may include any data of interest (or that may otherwise be used as a basis for an inference) to a downstream consumer of the inferences. For example, input data 207 may include data indicating the operability and/or specifications of a product on an assembly line.

Input data 207 may be fed into inference model portion 202A to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C to obtain output data 208. Output data 208 may include inferences collectively generated by the portions of the inference model distributed across data processing systems 201A-201C.

Output data 208 may be utilized by a downstream consumer of the data to perform a task, make a decision, and/or perform any other action set that may rely on the inferences generated by the inference model. For example, output data 208 may include a quality control determination regarding a product manufactured in an industrial environment. Output data 208 may indicate whether the product meets the quality control standards and should be retained or does not meet the quality control standards and should be discarded. In this example, output data 208 may be used by a robotic arm to decide whether to place the product in a "retain" area or a "discard" area.

While shown in FIG. 2B as including three data processing systems, a system may include any number of data processing systems to collectively execute the inference model. Additionally, as noted above, redundant copies of the inference model hosted by multiple data processing systems may each be maintained so that termination of any portion of the inference model may not impair the continued operation of the inference model.

In addition, the redundant copies of the inference model portions may be used ascertain whether any of data processing systems 201A-201C are compromised. For example, consider a scenario where data processing system 201B is compromised by a malicious party. The malicious party may modify the operation of inference model portion 202B to generate second partial processing result using a different process than expected or as specified by deployment plan 205. Consequently, when ingested into inference model portion 202C, the resulting output data 208 may also not reflect the expected output based on input data 207.

To ascertain whether any of data processing systems 201A-201C are compromised, duplicate processing results from at least two different data processing systems may be compared to one another. For example, a fourth data processing system (not shown) hosting a second copy of inference model portion 202B may ingest first partial processing result and generate a second instance of second partial processing result. The two second partial processing results may be compared to one another to ascertain whether data processing system 201B may be compromised. Refer to FIG. 2C for additional details regarding identification of compromised data processing systems.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system

201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

By executing an inference model across multiple data processing systems, computing resource expenditure throughout the distributed environment may be reduced. In addition, by managing execution of the inference model, the functionality and/or connectivity of the data processing systems may be adapted over time to remain in compliance with the needs of a downstream consumer.

Turning to FIG. 2C, a data flow diagram illustrating identification and remediation of compromised data processing systems in accordance with an embodiment is shown.

Once inference models are deployed to data processing systems, the inference models may generate partial processing results and output, as discussed with respect to FIG. 2B. However, if any of the inference models are compromised the resulting partial processing results and output (e.g., downstream of the compromised data processing system) may not be as expected based on the input. For example, with respect to FIG. 2B, if data processing system 201B is compromised, both second partial processing result and output data 208 may differ from that expected based on input 207 and the inference model of which inference model portions 202A-202C are members.

To identify and remediate compromised data processing systems, processing results (e.g., 220, 222) from two inference models portions may be obtained. The inference model portions may be expected to generate the same processing result for a same input partial processing result. For example, two distributed inference models of the same type of inference model may be expected to generate identical partial processing results and output based on a same input (e.g., presuming that the two distributed inference models are similarly portioned). While described with respect to the actual values, it will be appreciated that reduced size forms such as hashes of the values (e.g., partial processing results, output, etc.) may be used in place of the actual results to reduce communication bandwidth for data transmission.

Once obtained, comparison process 226 may be performed based on the processing results (e.g., 220, 222). If the processing results are the same (or substantially the same, within a threshold), then the processing results may indicate that the data processing systems hosting the portions of the inference models used to generate the processing results (e.g., 220, 222) are not compromised. In contrast, a difference between the processing results may indicate that the data processing systems are not compromised.

When comparison process 226 indicates that one of the data processing systems is compromised, then comparison process 228 may be performed. Comparison process 228 may be performed by comparing third processing result 230 (e.g., from another data processing system hosting a similar inference model portion) to first processing result 220 and second processing result 222. The comparison may indicate which of the processing results agree with one another and which of the processing results disagree. The processing results that disagrees with a majority of the processing results may be treated as indicating that the data processing systems hosting the inference model portions that generated the disagreeable processing result is compromised.

This process may be related any number of times (e.g., as indicated by the three dots) until a first set of a majority of the data processing systems that generated processing results that agree with each other is identified, a set of the data processing systems that generating processing results that disagree with the processing results generated by the majority.

Once obtained, the sets may be used in decision process 232 to identify one or more compromised device identifies. The compromised device identifies may then be used to drive remediation process 234.

Remediation process 234 may attempt to self-heal the data processing system identified by decision process 232, and, if the self-healing fails, may exclude the identified data processing system(s) from inference generation in the future.

As discussed above, the components of FIG. 1 may perform various methods to execute inference models throughout a distributed environment. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing inference models hosted by data processing systems in accordance with an embodiment is shown. The method may be performed, for example, by data processing systems (e.g., 100), an inference model manager (e.g., 102), and/or other components.

At operation 300, a first processing result is obtained. The first processing result may be from a first data processing system that hosts a portion of a first distributed inference model hosted by a first portion of data processing systems. The first processing result may be obtained by (i) obtaining it from the first data processing system, (ii) obtaining it from another device (e.g., another data processing system that hosts another portion of the distributed inference model), (iii) reading it from storage, and/or (iv) via other methods.

At operation 302, a second processing result is obtained. The second processing result may be from a second data processing system that hosts a portion of a second distributed inference model hosted by a second portion of the data processing systems. The second data processing system may host an identical inference model portion to that which is hosted and used by the first data processing system to generate the first processing result.

The second processing result may be obtained by (i) obtaining it from the second data processing system, (ii) obtaining it from another device (e.g., another data processing system that hosts another portion of the second distributed inference model), (iii) reading it from storage, and/or (iv) via other methods.

In an embodiment, the second processing result is obtained by temporarily modifying the second distributed inference model to isolate second data processing system from the other second portion of the data processing systems. For example, the input to the inference model portion hosted by the first data processing system may be used as input to the inference model portion hosted by the second data processing system. By doing so, both data processing systems will receive similar input which should result in the same output from the hosted inference model portions if both data processing systems are not compromised.

At operation 304, based on at least the first processing result and the second processing result, it is determined whether the first data processing system is compromised. The determination may be made by comparing the two processing results. If the two processing results are the same, then it may be determined that the first data processing system is not compromised.

If the two processing results differ, then additional processing results from other data processing systems hosting similar portions of other instances of the distributed inference model. As discussed with respect to FIG. 2C, these processing results may be compared to the first and second processing results to identify a majority that generate a same processing result and a minority that do not generate the same processing result. If the first processing result is in the minority, then it may be determined that the first data processing system is compromised. If the first processing result is not in the minority, then it may be determined that the first data processing system is not compromised.

If the first data processing system is compromised, then the method may proceed to operation 306. Otherwise the method may end following operation 304. However, it will be appreciated that the data processing systems that generated processing results that are in the minority may be determined to be compromised, and similar operations to that described below with respect to operations 306-310 may be performed for these data processing systems.

At operation 306, self-healing of the first distributed inference model is initiated using a third data processing system to remove the first data processing system from membership in the first portion of the data processing systems. The self-healing of the first distributed inference model may be initiated by (i) deploying an inference model portion to the third data processing system to replace the inference model portion deployed to the first data processing system, (ii) reconfiguring the portions of the first distributed inference model to use the inference model portion deployed to the third data processing system (e.g., so that partial processing results are appropriately forwarded), and (iii) excluding the first data processing system from operation as part of the first distributed inference model.

However, it will be appreciated that in some instances, this response may not successfully remediate operation of the first inference model. For example, if a different data processing system that hosted a portion of the first inference model was actually compromised and generated a partial processing result used by the first data processing system, then mere replacement of one of first data processing system may not remedy the operation of the first distributed inference model.

At operation 308, it is determined whether the self-healing secured the first distributed inference model. The determination may be made similarly to operations 300-304, where processing results from the third data processing system are compared to similar processing results generated by other data processing systems hosting other instances of the same distributed inference model.

If it is determined that the first distributed inference model was not secured by the self-healing, then the method may proceed to operation 310. Otherwise the method may end following operation 308.

At operation 310, the data processing systems are rebalanced to host a number of instances of an inference model of the type of the first distributed inference model as specified by a deployment plan. The data processing systems may be rebalanced by (i) excluding the first and other data processing systems that hosted the first inference model and (ii) reallocating other data processing systems to host a new instance of the first distributed inference model. By doing so, all data processing systems that hosted the first distributed inference model and that could be compromised are excluded from hosting inference models thereby remediating the threat of inaccurate inference generation due to compromise.

The method may end following operation 310.

Using the method illustrated in FIG. 3, a system in accordance with an embodiment may proactively identify and remediate compromised data processing systems hosting inference models. By doing so, the accuracy of inferences generated by these data processing systems may be made more likely to be accurate.

Figure 4:
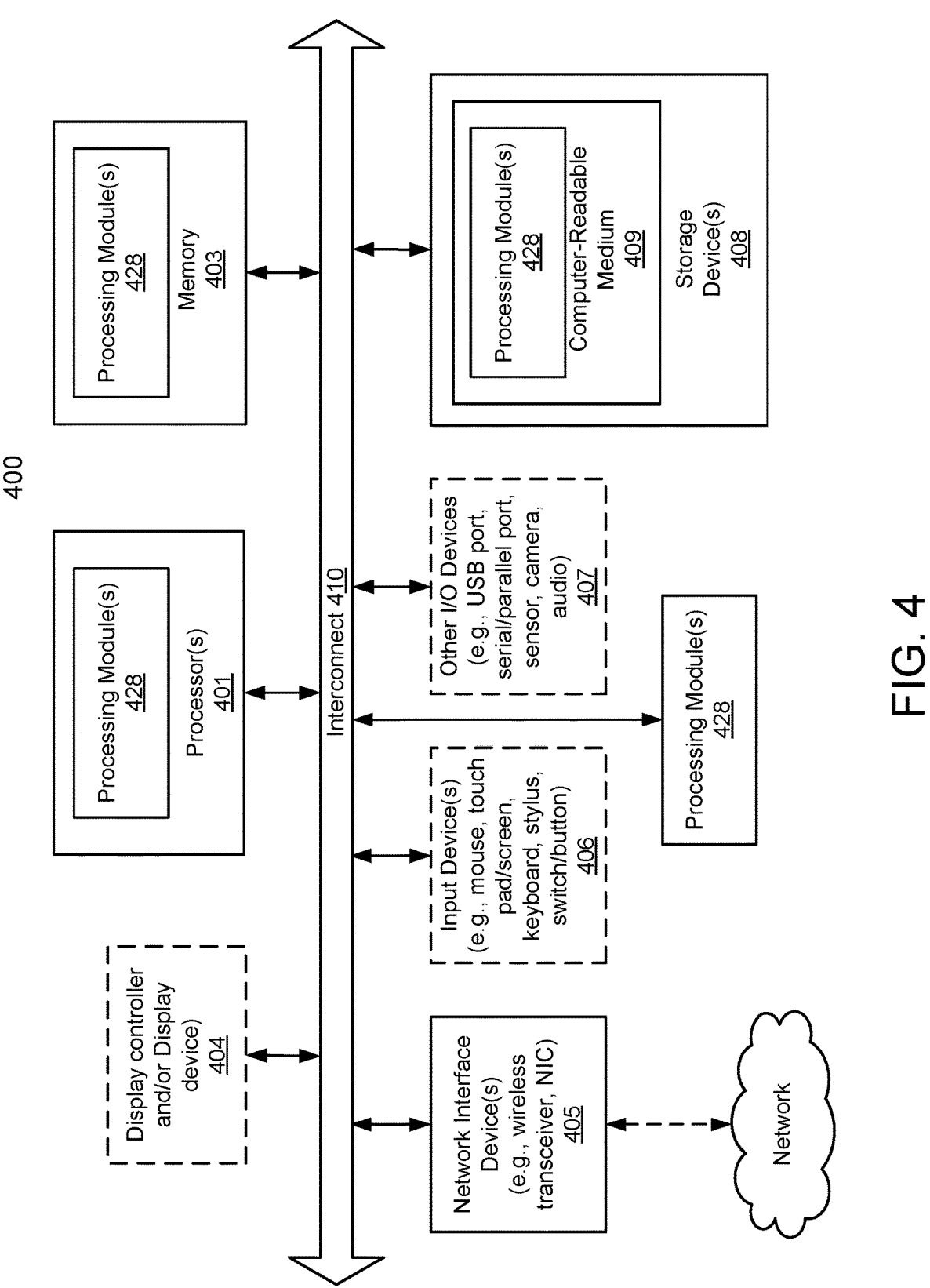
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In an embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in an embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft R, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing inference models hosted by data processing systems, the method comprising:

obtaining a first processing result from a first data processing system that hosts a portion of a first distributed inference model hosted by a first portion of the data processing systems;

obtaining a second processing result from a second data processing system that hosts a portion of a second distributed inference model hosted by a second portion of the data processing systems;

making a determination, based at least in part on the first processing result and the second processing result, regarding whether the first data processing system is compromised; and in an instance of the determination where the first data processing system is compromised:

initiating self-healing of the first distributed inference model using a third data processing system, that is a separate computing device from both the first data processing system and the second processing system, by at least:

removing the first data processing system from being a member of the first portion of the data processing systems such that the portion of the first distributed inference model hosted by the first data processing system is excluded from operations of other portions of the first distributed inference model hosted by the first portion of the data processing systems;

deploying a new instance of the portion of the first distributed inference model to the third data processing system to replace the portion of the first distributed inference model hosed by the first data processing system; and reconfiguring the other portions of the first distributed inference model hosted by the first portion of the data processing systems to use the new instance of the first distributed inference model hosted by the third data processing system.

2. The method of claim 1, wherein making the determination comprises:

making a first comparison between the first processing result and the second processing result; and in an instance of the first comparison where the first processing result and the second processing result are different:

obtaining a third processing result from a fourth data processing system that hosts a portion of a third distributed inference model hosted by a third portion of the data processing systems, the fourth data processing system being a separate computing device from all of the first data processing system, the second data processing system, and the third data processing system;

making a second comparison between the first processing result and the third processing result and a third comparison between the second processing result and the third processing result; and in an instance of the second comparison where the first processing result and the third processing result are different and in an instance of the third comparison where the second processing result and the third processing result are not different:

determining that the first data processing system is compromised.

3. The method of claim 2, wherein the second distributed inference model is redundant for the first distributed inference model, and the third distributed inference model is redundant for the first distributed inference model.

4. The method of claim 3, wherein the first processing result, the second processing result, and the third processing result are obtained using a same input.

5. The method of claim 4, further comprising:

making a second determination regarding whether the self-healing has secured the first distributed inference model;

in an instance of the second determination where the first distributed inference model is not secured:

disabling at least the first data processing system; and rebalancing the data processing systems to host a number of instances of an inference model of a type of the first distributed inference model as specified by a deployment plan for the inference models.

6. The method of claim 5, wherein the first processing result comprises a partial processing result used by the first distributed inference model to obtain an output.

7. The method of claim 5, wherein the first processing result comprises an output of the first distributed inference model.

8. The method of claim 7, wherein the first processing result is a first hash of the output of the first distributed inference model and the second processing result is a second hash of an output of the second distributed inference model, the first hash and the second hash being reduced size forms of the output of the first distributed inference model and the output of the second distributed inference model, respectively.

9. A non-transitory machine-readable medium having instructions stored therein, which when executed by a processor, cause the processor to perform operations for managing inference models hosted by data processing systems, the operations comprising:

obtaining a first processing result from a first data processing system that hosts a portion of a first distributed inference model hosted by a first portion of the data processing systems;

obtaining a second processing result from a second data processing system that hosts a portion of a second distributed inference model hosted by a second portion of the data processing systems;

making a determination, based at least in part on the first processing result and the second processing result, regarding whether the first data processing system is compromised; and in an instance of the determination where the first data processing system is compromised:

initiating self-healing of the first distributed inference model using a third data processing system, that is a separate computing device from both the first data processing system and the second processing system, by at least:

removing the first data processing system from being a member of the first portion of the data processing systems such that the portion of the first distributed inference model hosted by the first data processing system is excluded from operations of other portions of the first distributed inference model hosted by the first portion of the data processing systems;

deploying a new instance of the portion of the first distributed inference model to the third data processing system to replace the portion of the first distributed inference model hosed by the first data processing system; and reconfiguring the other portions of the first distributed inference model hosted by the first portion of the data processing systems to use the new instance of the first distributed inference model hosted by the third data processing system.

10. The non-transitory machine-readable medium of claim 9, wherein making the determination comprises:

making a first comparison between the first processing result and the second processing result; and in an instance of the first comparison where the first processing result and the second processing result are different:

obtaining a third processing result from a fourth data processing system that hosts a portion of a third distributed inference model hosted by a third portion of the data processing systems, the fourth data processing system being a separate computing device from all of the first data processing system, the second data processing system, and the third data processing system;

making a second comparison between the first processing result and the third processing result and a third comparison between the second processing result and the third processing result; and in an instance of the second comparison where the first processing result and the third processing result are different and in an instance of the third comparison where the second processing result and the third processing result are not different:

determining that the first data processing system is compromised.

11. The non-transitory machine-readable medium of claim 10, wherein the second distributed inference model is redundant for the first distributed inference model, and the third distributed inference model is redundant for the first distributed inference model.

12. The non-transitory machine-readable medium of claim 11, wherein the first processing result, the second processing result, and the third processing result are obtained using a same input.

13. The non-transitory machine-readable medium of claim 12, wherein the operations further comprise:

making a second determination regarding whether the self-healing has secured the first data processing system;

in an instance of the second determination where the first distributed inference model is not secured:

disabling at least the first data processing system; and rebalancing the data processing systems to host a number of instances of an inference model of a type of the first distributed inference model as specified by a deployment plan for the inference models.

14. The non-transitory machine-readable medium of claim 13, wherein the first processing result comprises a partial processing result used by the first distributed inference model to obtain an output.

15. The non-transitory machine-readable medium of claim 13, wherein the first processing result comprises an output of the first distributed inference model.

16. The non-transitory machine-readable medium of claim 15, wherein the first processing result is a first hash of the output of the first distributed inference model and the second processing result is a second hash of an output of the second distributed inference model.

17. A data processing system, comprising:

a processor; and a memory coupled to the processor to store instructions, which when executed by the processor, cause the processor to perform operations for managing a distribution of inference models hosted by data processing systems, the operations comprising:

obtaining a first processing result from a first data processing system that hosts a portion of a first distributed inference model hosted by a first portion of the data processing systems;

obtaining a second processing result from a second data processing system that hosts a portion of a second distributed inference model hosted by a second portion of the data processing systems;

making a determination, based at least in part on the first processing result and the second processing result, regarding whether the first data processing system is compromised; and in an instance of the determination where the first data processing system is compromised:

initiating self-healing of the first distributed inference model using a third data processing system, that is a separate computing device from both the first data processing system and the second processing system, by at least:

removing the first data processing system from being a member of the first portion of the data processing systems such that the portion of the first distributed inference model hosted by the first data processing system is excluded from operations of other portions of the first distributed inference model hosted by the first portion of the data processing systems;

deploying a new instance of the portion of the first distributed inference model to the third data processing system to replace the portion of the first distributed inference model hosed by the first data processing system; and reconfiguring the other portions of the first distributed inference model hosted by the first portion of the data processing systems to use the new instance of the first distributed inference model hosted by the third data processing system.

18. The data processing system of claim 17, wherein making the determination comprises:

making a first comparison between the first processing result and the second processing result; and in an instance of the first comparison where the first processing result and the second processing result are different:

obtaining a third processing result from a fourth data processing system that hosts a portion of a third distributed inference model hosted by a third portion of the data processing systems, the fourth data processing system being a separate computing device from all of the first data processing system, the second data processing system, and the third data processing system;

making a second comparison between the first processing result and the third processing result and a third comparison between the second processing result and the third processing result; and in an instance of the second comparison where the first processing result and the third processing result are different and in an instance of the third comparison where the second processing result and the third processing result are not different:

determining that the first data processing system is compromised.

19. The data processing system of claim 18, wherein the second distributed inference model is redundant for the first distributed inference model, and the third distributed inference model is redundant for the first distributed inference model.

20. The data processing system of claim 19, wherein the first processing result, the second processing result, and the third processing result are obtained using a same input.

* * * * *